United States Patent
Norton et al.

(10) Patent No.: US 7,313,695 B2
(45) Date of Patent: Dec. 25, 2007

(54) SYSTEMS AND METHODS FOR DYNAMIC THREAT ASSESSMENT

(75) Inventors: Marc A. Norton, Eldersburg, MD (US); Daniel J. Roelker, Arlington, VA (US)

(73) Assignee: Sourcefire, Inc., Columbia, MD (US)

( * ) Notice: Subject to any disclaimer, the term of this patent is extended or adjusted under 35 U.S.C. 154(b) by 716 days.

(21) Appl. No.: 10/806,434

(22) Filed: Mar. 23, 2004

(65) Prior Publication Data

US 2005/0216764 A1    Sep. 29, 2005

(51) Int. Cl.
*G06F 9/00* (2006.01)
(52) U.S. Cl. .................. 713/166; 713/152; 713/193
(58) Field of Classification Search ................ 713/166, 713/152, 193
See application file for complete search history.

(56) References Cited

U.S. PATENT DOCUMENTS 4,570,157 A * 2/1986 Kodaira ...................... 340/567
4,857,912 A * 8/1989 Everett et al. .............. 340/508
4,912,748 A * 3/1990 Horii et al. ................. 250/221

* cited by examiner

*Primary Examiner*—Thomas R. Peeso
(74) *Attorney, Agent, or Firm*—Posz Law Group, PLC (57) ABSTRACT

The threat probability of events generated by a security device on a computer network is assessed by comparing the threat probability to a global threat probability. An abstract data type is used to describe how the events are combined to form a threat. If an event matches an unpopulated member of an instance of an abstract data type, the event is added to the instance and the probability of the instance is computed. If the probability of the instance is greater than a global threat probability, a dynamic threat assessment event is generated. A system for dynamically assessing threats to computers and computer networks system includes at least one security device that generates events, an event collection database, policy configuration information, and a dynamic threat assessment engine.

26 Claims, 4 Drawing Sheets

SYSTEMS AND METHODS FOR DYNAMIC THREAT ASSESSMENT

BACKGROUND OF THE INVENTION

1. Field of the Invention

Embodiments of the present invention relate to methods and systems for dynamic threat assessment using computer or computer network security devices. More particularly, embodiments of the present invention relate to systems and methods for combining attack identification and event correlation from one or more security devices that generate events. These systems and methods provide a real-time assessment of which internal computers are at future risk for what type of attack, and which external computers may need to be watched more closely in the future.

2. Background Information

Most successful computer intrusions and computer network attacks consist of a series of calculated steps. While each step may not normally constitute an intrusion or attack, the culmination of steps often does. In addition, the end goals of each series of steps that constitutes an intrusion or attack vary widely. For example, an attacker may have the goal of compromising a host for conducting future attacks. Such an attacker will most likely do port reconnaissance, host service identification, service exploitation, and finally installation of a root kit or backdoor. Another attacker may have the goal of compromising a host to take specific information located on that host. Such an attacker may guess a user's password and transfer the desired files back across the network to a zombie host to defeat trace backs.

In view of the foregoing, it can be appreciated that a substantial need exists for systems and methods that can advantageously predict or discover an intrusion or attack by analyzing a series of security device events over time.

BRIEF SUMMARY OF THE INVENTION

Embodiments of the present invention relate to systems and methods for combining attack identification and event correlation information from security devices that generate events. One embodiment of the present invention is a method for assessing a threat probability of events generated by a security device. In this method, an event from a security device is received by an event collection database. If the event matches an unpopulated member of an instance of an abstract data type, the event is added to the instance and the probability of the instance is computed. The instance of an abstract data type represents a rule that describes how events are combined to form a threat. If the probability of the instance is greater than a global threat assessment event generation probability, a second event is generated and the second event is placed in the event collection database.

Another embodiment of the present invention is a method for dynamically assessing threats to computers and computer networks using security devices that generate events. In this method, policy configuration information is read. This information includes a global threat assessment event generation probability and dynamic threat assessment rules containing event probability information. Abstract data types are generated for each dynamic threat assessment rule. Events from the security devices are collected and stored in an event collection database. An event in the event collection database is read. It is determined if the event is a member of an instance of an abstract data type. If the event is a member of the instance, the event is added to an instance and the probability of the instance is computed. It is determined if the probability of the instance is greater than the global threat assessment event generation probability. If the probability of the instance is greater than the global threat assessment event generation probability, a dynamic threat assessment event is generated and the dynamic threat assessment event is placed in the event collection database. It is then determined if the event is a starting member of an abstract data type. If the event is a starting member of the abstract data type, an instance of the abstract data type is created and the event is added to the instance.

Another embodiment of the present invention is a system for dynamically assessing threats to computers and computer networks. The system includes at least one security device that generates events, an event collection database, policy configuration information, and a dynamic threat assessment engine. The event collection database receives and stores events generated by security devices. The policy configuration information includes a global threat assessment event generation probability and dynamic threat assessment rules containing event probability information. The dynamic threat assessment engine reads the policy configuration information and creates abstract data types based on the dynamic threat assessment rules. The dynamic threat assessment engine populates instances of the abstract data types with events from the event collection database. The dynamic threat assessment engine generates events for instances with probabilities greater than the global threat assessment event generation probability and places these events back into the event collection database.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Embodiments of systems and methods related to combining attack identification and event correlation information from security devices that generate events are described in this detailed description of the invention. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

A computer security event or computer network security event is defined herein as logged information associated with an unwanted intrusion or a potentially unwanted intrusion. These events are generated through a process called attack identification. Attack identification in intrusion detection systems (IDS), for example, involves searching individual packets for patterns indicative of an intrusion or potential intrusion. When a known intrusion pattern is found by an IDS, the IDS generates an event.

Unfortunately, however, an attack on a computer or computer network may consist of two or more steps or intrusions, which individually would otherwise be innocuous. Once detected, these steps or intrusions result in one or more events. Current IDS technologies enable analysts to detect such events, and some correlation technologies can put multiple events together to give an analyst a view of a "super" event. These technologies are collectively called event correlation.

One embodiment of the present invention takes attack identification and event correlation one step further. This embodiment analyzes events from a variety of security devices that generate events and determines what combinations of attacks coming from and going to various hosts might indicate that a larger, coordinated attack is in progress. Security devices that generate events include but are not limited to network intrusion detection systems (NIBS), host intrusion detection systems (HIDES), routers, fireballs, and system loggers.

This embodiment of the present invention provides a security analyst with a real-time assessment of which hosts are at future risk for what type of attack and which external hosts may need to be watched more closely in the future. This assessment is referred to herein as dynamic threat assessment (DATA). The information provided by this assessment gives the analyst a chance to take immediate measures in preventing further exploitation.

A DTA system is a dynamic system in that it solves the problem of the "all or nothing" or static approach to intrusion detection and prevention. Currently, intrusion detection technologies are either active or passive, and there is no in between. A security analyst decides which attacks to stop at the gateway and which attacks will be let through and monitored passively. To an analyst, there is a gap between these technologies. That gap is the ability to predict impending attacks, which would allow the analyst to take immediate action on threats that have a high probability of occurring.

A DTA system solves this problem by allowing probabilities to be assigned and reassigned to one or more events based on a variety of conditions. These conditions include but are not limited to the number of other events, the type of other events, the order of other events, and the timing of other events. The security analyst can then predict and interdict attacks based on an overall probability of attack for the computer or computer network.

The present invention is based on current methods of hacker exploitation and maps out the various paths that attackers can take to reach their goals. Of course, as one of skill in the art would appreciate, the present invention could be adapted to new methods of hacker exploitation as they develop. Nonetheless, the general approach to DTA is twofold. The first part is programmable knowledge of how current network and host attacks are defined. This is accomplished through either a dynamic information base, e.g., rules and signatures, or through hard-coding the information base in the technology.

The second part is accomplished through the integration of abstract data types with the information base in part one. These abstract data types provide the technology for modeling and predicting attack vectors under various degrees of uncertainty. One exemplary method of modeling attack vectors is through the use of an attack tree. An attack tree is a tree structure where the root node represents the attack goal and each leaf node represents a method of achieving that goal. An exemplary method of using attack trees was described by Bruce Schneier in "Attack Trees", Dr. Dobb's Journal, December 1999, and is incorporated herein by reference in its entirety.

Figure 1:
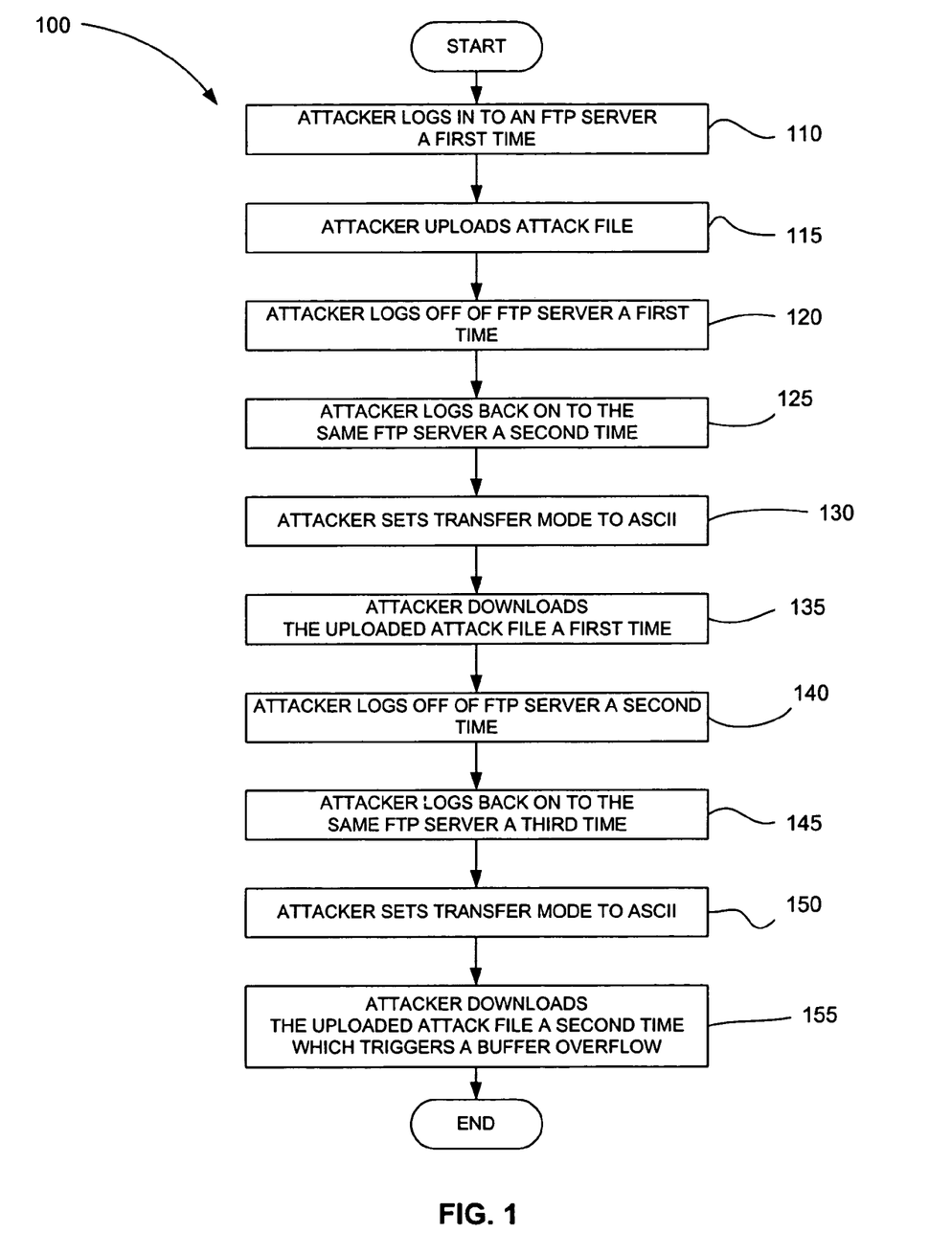
FIG. 1 is a flowchart showing the steps of an exemplary vulnerability that can be detected and ameliorated by an embodiment of the present invention.

FIG. 1 is a flowchart showing the steps of an exemplary vulnerability that can be detected and ameliorated by an embodiment of the present invention. This exemplary vulnerability has been found in the ProFTPd program.

In step 110 of vulnerability 100, the attacker logs on to an FTP server a first time.

In step 115, the attacker uploads an attack file to the FTP server.

In step 120, the attacker logs off of the FTP server a first time.

In step 125, the attacker logs back on to the same FTP server a second time.

In step 130, the attacker sets the transfer mode to ASCII.

In step 135, the attacker downloads the uploaded attack file a first time.

In step 140, the attacker logs off of the FTP server a second time.

In step 145, the attacker logs back on to the same FTP server a third time.

In step 150, the attacker sets the transfer mode to ASCII.

In step 155, the attacker downloads the uploaded attack file a second time, which triggers a buffer overflow.

According to one embodiment of a method for DTA of the present invention, an analyst first sets a probability level on the vulnerability 100 of FIG. 1 that triggers when a certain number of the steps have been completed. If the probability level is set high (i.e., greater number of steps completed), there is a smaller chance of an invalid assessment. Next, the attacker's IP address is blocked at the firewall when the specified number of steps have occurred and the set probability level of the detection system is less than or equal to the probability of vulnerability 100. In another embodiment, a countermeasure other than blocking the attacker's IP address at the firewall is taken to prevent vulnerability 100 before it occurs.

Figure 2:
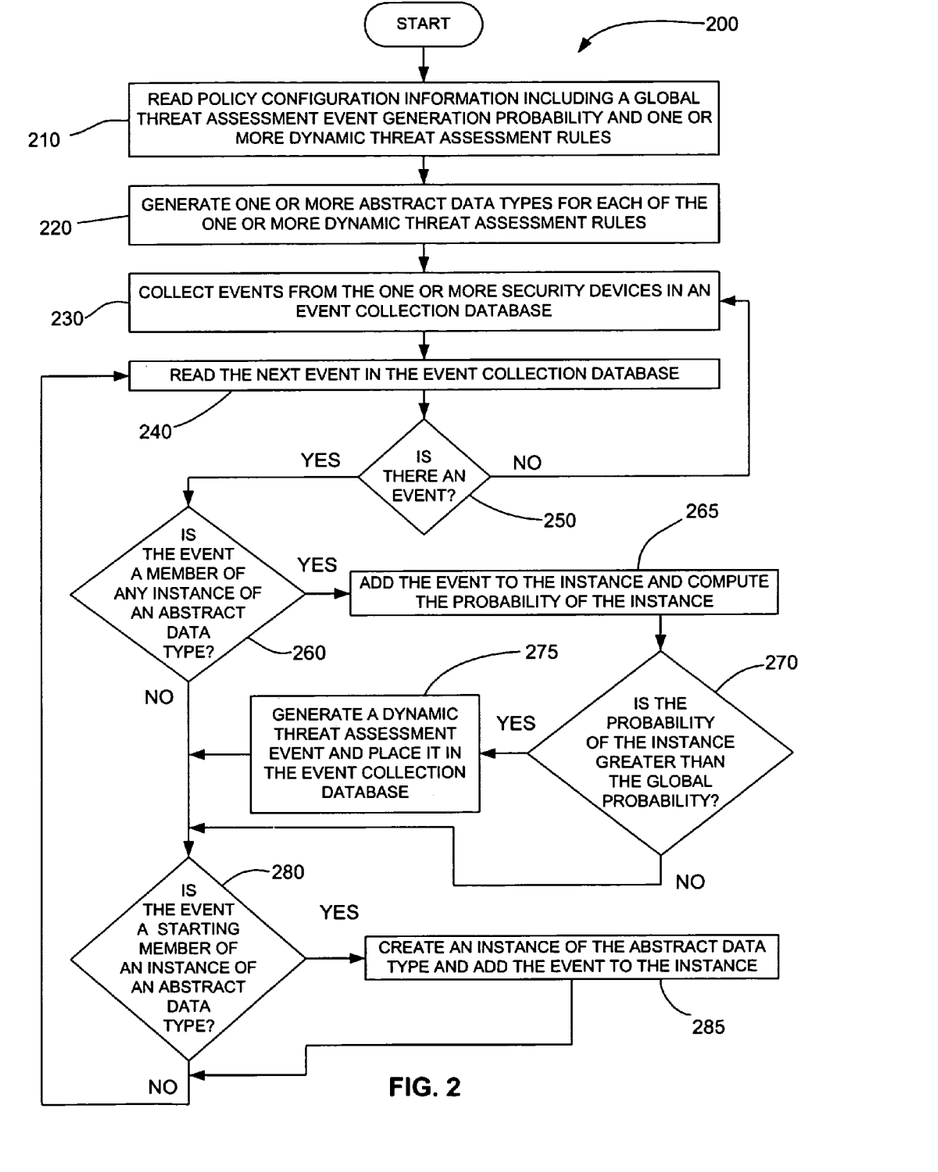
FIG. 2 is a flowchart showing the steps of an exemplary method for dynamic threat assessment in accordance with an embodiment of the present invention.

FIG. 2 is a flowchart showing the steps of an exemplary method for DTA in accordance with an embodiment of the present invention.

In step 210 of method 200, policy configuration information is read. This information includes a global threat assessment event generation probability and one or more DTA rules. The global threat assessment event generation probability is set by the user or security analyst and represents the overall probability threshold for generating DTA events.

DTA rules are the directives that specify how one or more events constitute an attack or threat. These directives include information on how the probabilities of the one or more events that constitute an attack should be computed.

In another embodiment of this method, the policy configuration information includes rule probability thresholds for each DTA rule. These thresholds provide specific probability limitations for each instance of an abstract data type created from a DTA rule.

In another embodiment of this method, the policy configuration information includes event collection database configurations. Exemplary configurations include information about how events are collected, received, and stored from one or more security devices and from the DTA system itself. This information includes the ordering and timing of event collection.

In another embodiment of this method, the policy configuration information includes operation parameters. Exemplary operation parameters include limitations on system memory and CPU usage.

In step 220, one or more abstract data types are generated for each of the one or more DTA rules. These abstract data types include but are not limited to graphs, trees, lists, state machines, hash tables, and Bayesian networks. Each abstract data type includes probability information obtained from its rule that is used when computing the probabilities of instances of each abstract data type.

In step 230, events are collected from one or more security devices and are stored in an event collection database. In an alternative embodiment, event information is pushed from the one or more security devices into the event collection database, rather than being pulled from the one or more security devices. In other words, events are received by the event collection database from the one or more security devices.

In step 240, an attempt is made to read an event from the event collection database.

In step 250, it is determined if there are any unprocessed events in the event collection database. If there are no more unprocessed events, then collection of events from the one or more security devices (step 230) is attempted again. If there are more unprocessed events, step 260 is executed with the next unprocessed event.

In step 260, it is determined if the event is a member of any of the current instances of abstract data types. An instance is defined herein as a copy of a abstract data type that can contain actual data. An instance of an abstract data type is created when an event is found that is a starting member of the abstract data type. For example, if the abstract data type is a linked list of three events where the order is important, an instance of the linked list will be created when the event representing the first link, or first member, in the list is found. An instance of an abstract data type remains in memory until the calculated probability of the instance exceeds a probability threshold. In another embodiment of this method, an instance is removed from memory after a certain time period. In step 260, the event is processed against all instances of abstract data types currently in memory. Processing the event against an instance includes but is not limited to reading lookup information in the event including host IP addresses and comparing that lookup information to a member of the instance. For each instance of abstract data types that includes the event as a member, step 265 is executed. If the event is not a member of any of the instances of abstract data types currently in memory, step 265 is not executed.

In step 265, the event is added to that instance and the probability of the instance is recomputed. The probability of the instance is recomputed based on one or more conditions relative to the added event. These conditions include but are not limited to the number of other events, the type of other events, the order of other events, and the timing of the other events. For example, consider three different types of events A, B, and C. By themselves, events A, B, and C have threat probabilities of ten, twenty, and thirty, respectively. However, in combination, event A and event B have a threat probability of fifty, and, in combination, event A and event C have a threat probability of zero. Suppose then that event A is the only event of an instance. That instance will have a probability of ten. If event B is added to that instance, however, its probably is recomputed and becomes fifty. If alternatively event C is added to that instance, its probably is recomputed and becomes zero. In this example, the probability of the instance is recomputed based on the type of the event added to the instance, event B or event C, relative to the type of the other event already part of the instance, in this case event A.

In step 270, the probabilities of all the instances to which the event has been added are compared to the global threat assessment event generation probability. If the probability of an instance is greater than the global threat assessment event generation probability, step 275 is executed. If the probability of the instance is not greater than the global threat assessment event generation probability, step 275 is not executed. In another embodiment of this method, step 275 is executed if the probability of the instance is greater than or equal to the global threat assessment event generation probability and step 275 is not executed if the probability of the instance is less than the global threat assessment event generation probability.

In another embodiment of this method, each of the probabilities of all the instances to which the event has been added is compared to its specific rule probability threshold in addition to the global threat assessment event generation probability. If the probability of an instance is greater than its rule probability threshold, step 275 is executed. If the probability of the instance is not greater than its rule probability threshold, step 275 is not executed. In another embodiment of this method, step 275 is executed if the probability of the instance is greater than or equal to its rule probability threshold and step 275 is not executed if the probability of the instance is less than its rule probability threshold.

In step 275, a DTA event is generated for the instance and is placed in the event collection database. In another embodiment of this method, the DTA event it treated as any other event in the event collection database and is processed in a feedback loop beginning at step 240. In another embodiment of this method, the instance is removed from memory after a DTA event has been generated.

In step 280, it is determined if the event is a starting member of any of the abstract data types. The event is processed against each abstract data types to determine if a new instance should be created. If the event is a starting member of an abstract data type, step 285 is executed. If the event is not a starting member of an abstract data type, step 285 is not executed.

In step 285, an instance of the abstract data type is created and the event is added to the instance. In another embodiment of this method, the probability of the instance is computed and the method continues at step 270 after step 285 has been executed. This allows DTA events to be generated from instances containing a single event.

When an event has been processed against all current instances of abstract data types and all abstract data types without an instance, the process returns to step 240 to obtain the next unprocessed event.

Figure 3:
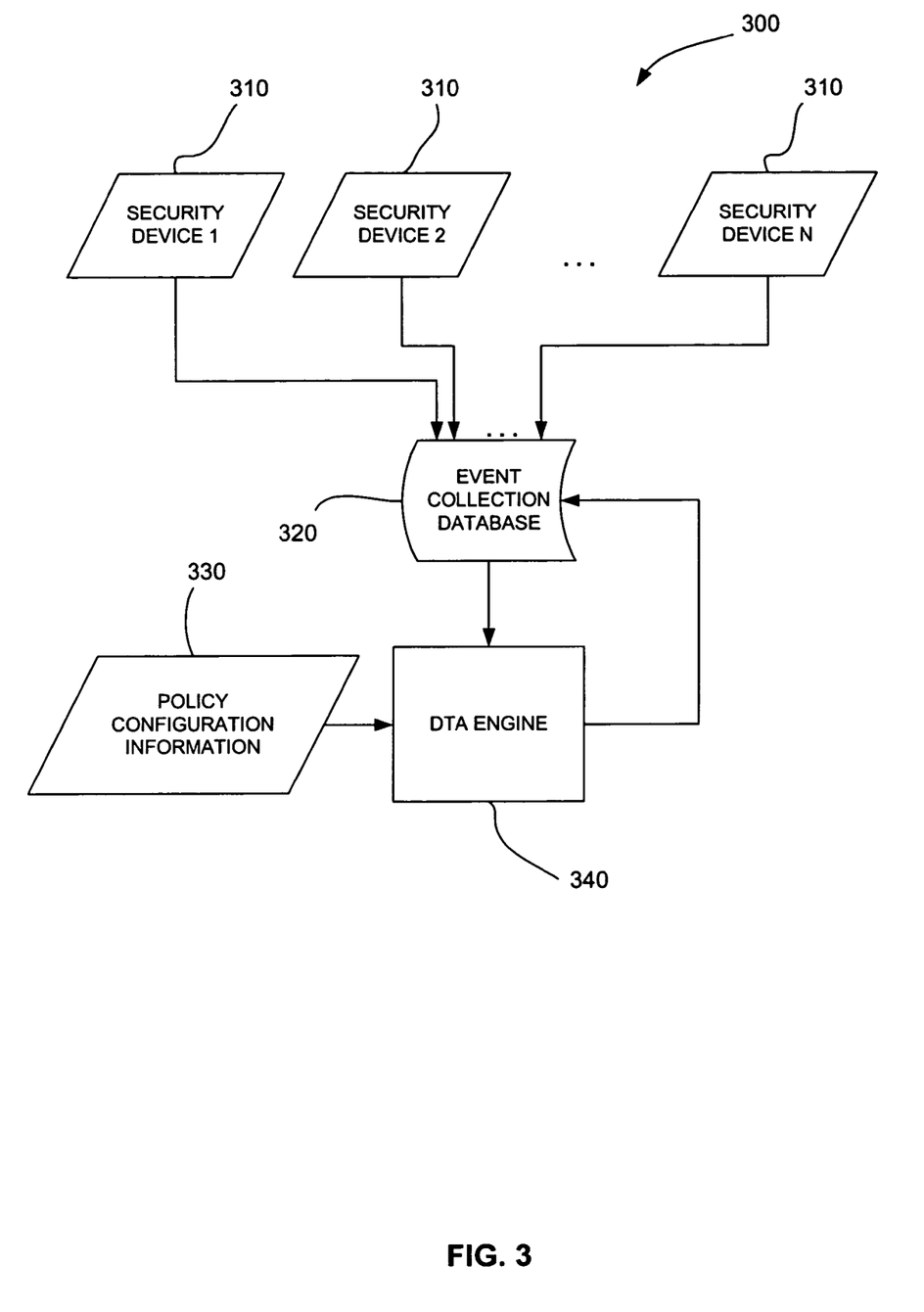
FIG. 3 is a schematic diagram showing an exemplary dynamic threat assessment system in accordance with an embodiment of the present invention.

FIG. 3 is a schematic diagram showing an exemplary DTA system in accordance with an embodiment of the present invention.

One or more security devices 310 of system 300 perform attack identification and generate events. One or more security devices 310 include but are not limited to IDS, NIBS, HIDES, routers, fireballs, and system loggers.

The events generated by one or more security devices 310 are collected and stored by event collection database 320. In another embodiment of this method, event collection database 320 receives and stores events from one or more security devices 310 and DTA engine 340. In another embodiment of this method, event collection database 320 is a logging system of a security device that generates events.

Policy configuration information 330 includes but is not limited to a global threat assessment event generation probability and one or more DTA rules containing event probability information. In another embodiment of this method, policy configuration information 330 includes but is not limited to rule probability thresholds. In another embodiment of this method, policy configuration information 330 includes but is not limited to event collection database configurations. In another embodiment of this method, policy configuration information 330 includes but is not limited to operation parameters.

DTA engine 340 performs a number of functions. It accepts policy configuration information 330 and generates one or more abstract data types for one or more DTA rules. It reads each event in the event collection database 320. It determines if each event is a member of each instance of one or more abstract data types for each of one or more DTA rules. If the event is a member of the instance, it adds each event to an instance and computes a probability of the instance. It determines if the probability of the instance is greater than the global threat assessment event generation probability. If the probability of the instance is greater than the global threat assessment event generation probability, it generates a DTA event and places the DTA event in event collection database 320. It determines if the event is a starting member of an instance of one or more abstract data types for each of one or more DTA rules. Finally, if the event is a starting member of the instance, it creates the instance and adds the event to the instance.

In another embodiment of this system, DTA engine 340 determines if the probability of the instance is greater than a rule probability threshold for each instance.

In another embodiment of this system, DTA engine 340 removes an instance from memory, if the probability of the instance is greater than the global threat assessment event probability.

In another embodiment of this system, DTA engine 340 removes an instance from memory, if the probability of the instance is greater than the rule probability threshold of the instance.

In another embodiment of this system, a system management console includes event collection database 320, policy configuration information 330, and DTA engine 340.

Figure 4:
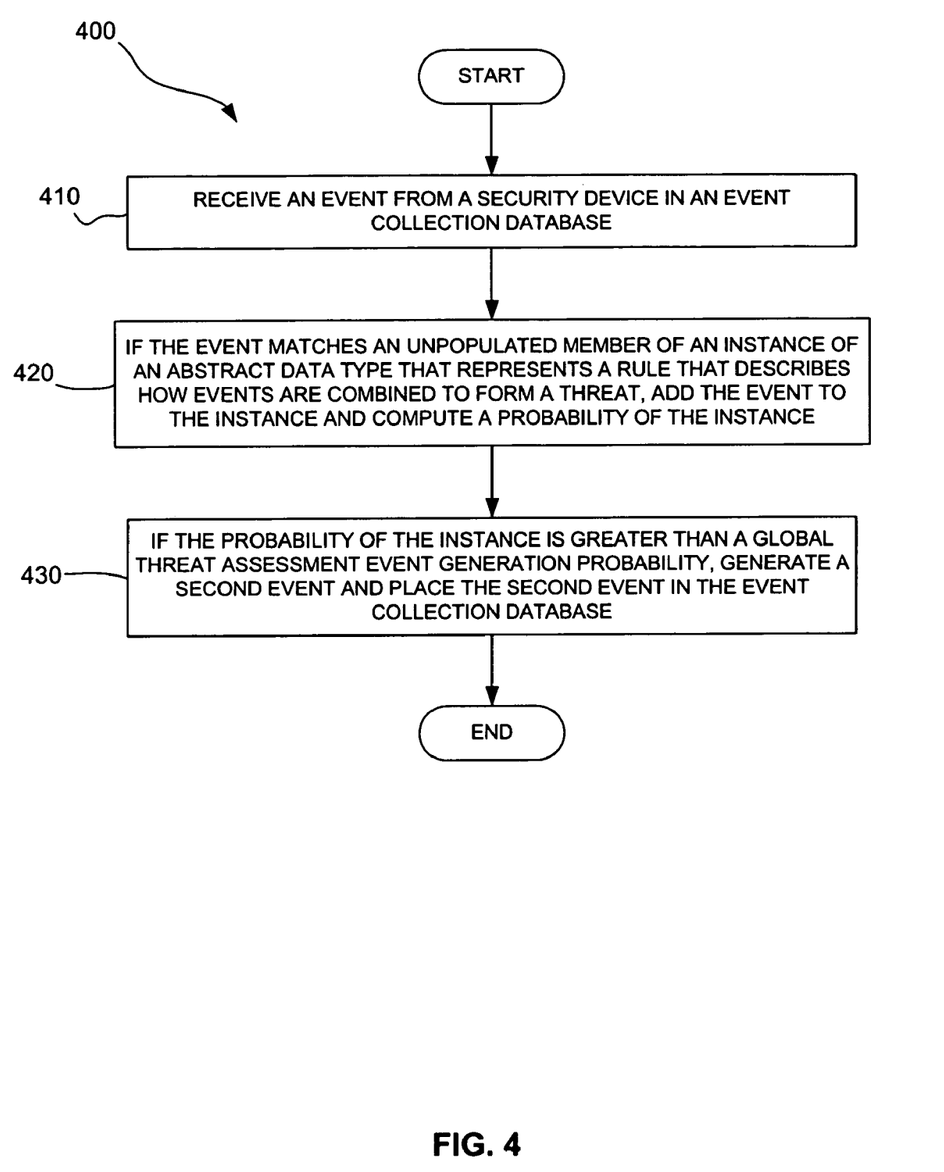
FIG. 4 is a flowchart showing the steps of an exemplary method for assessing a threat probability of an event generated by a security device in accordance with an embodiment of the present invention.

FIG. 4 is a flowchart showing the steps of an exemplary method for assessing a threat probability of an event generated by a security device in accordance with an embodiment of the present invention.

In step 410 of method 400, the event is received from a security device by an event collection database.

In step 420, if the event matches an unpopulated member of an instance of an abstract data type, the event is added to the instance and a probability of the instance is computed. The instance of the abstract data type represents a rule that describes how events are combined to form a threat.

In step 430, if the probability of the instance is greater than a global threat assessment event generation probability, a second event is generated and the second event is placed in the event collection database. The second event is a DTA event.

Method 400 describes the computation of a threat probability of an event by combining the probability of that event with the probabilities of other events that have occurred. The threat is assessed by comparing the combined probability with a probability threshold. Method 400 also provides a feedback mechanism that places DTA events in the same event collection database as events generated by a security device. In another embodiment this method, this feedback mechanism is used to assess threats that are composed of other threats. In this embodiment, DTA events are obtained from the event collection database and are processed in the same manner as events generated from a security device.

The present invention is an important enhancement to event correlation and provides a powerful tool to mitigate attacks in real-time. The present invention can be used to detect more general types of approaches that might, for example, use port scanning, followed by service identification, and forecast a possible attack in progress even though the exact attack may be unknown or undetectable. This gives the analyst the ability to detect zero-day exploits given that the exploit follows previous attack methodologies. Zero-day exploits are attacks that have not yet been published, so no specific rules yet exist to protect against them.

In accordance with an embodiment of the present invention, instructions adapted to be executed by a processor to perform a method are stored on a computer-readable medium. The computer-readable medium can be a device that stores digital information. For example, a computer-readable medium includes a read-only memory (e.g., a Compact Disc-ROM ("CD-ROM") as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

In this detailed description, systems and methods in accordance with embodiments of the present invention have been described with reference to specific exemplary embodiments. Accordingly, the present description and figures are to be regarded as illustrative rather than restrictive.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

Systems and methods in accordance with an embodiment of the present invention disclosed herein can advantageously reduce the number of successful computer intrusions by identifying collections of IDS events as computer or network attacks.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be further understood by the numbered examples appended hereto, and by their equivalents.

We claim:

1. A method for dynamically assessing threats to computers and computer networks using one or more security devices that generate events, comprising:
    reading policy configuration information, wherein the policy configuration information comprises a global threat assessment event generation probability and one or more dynamic threat assessment rules comprising event probability information;
    generating one or more abstract data types for each of the one or more dynamic threat assessment rules;
    collecting and storing events from the one or more security devices in an event collection database;
    reading each event in the event collection database;
    determining if the each event is a member of each instance of the one or more abstract data types for each of the one or more dynamic threat assessment rules;
    if the each event is a member of the each instance, adding the each event to the each instance and computing a probability of the each instance;
    determining if the probability is greater than the global threat assessment event generation probability;
    if the probability is greater than the global threat assessment event generation probability, generating a dynamic threat assessment event and placing the dynamic threat assessment event in the event collection database;
    determining if the each event is a starting member of an instance of the one or more abstract data types for each of the one or more dynamic threat assessment rules; and
    if the each event is a starting member of the instance, creating the instance and adding the each event to the instance.

2. The method of claim 1, wherein the one or more security devices comprise an intrusion detection system, a network intrusion detection system, a host intrusion, detection system, a muter, a firewall, and a system logger.

3. The method of claim 1, wherein the policy configuration information further comprises rule probability thresholds.

4. The method of claim 3, further comprising determining if the probability is greater than a rule probability threshold for the each instance.

5. The method of claim 4, further comprising if the probability is greater than the rule probability threshold for the each instance, generating a dynamic threat assessment event and placing it in the event collection database.

6. The method of claim 4, further comprising removing the each instance from memory, if the probability is greater than the rule probability threshold for the each instance.

7. The method of claim 1, wherein the policy configuration information further comprises event collection database configurations.

8. The method of claim 1, wherein the policy configuration information further comprises operation parameters.

9. The method of claim 1, wherein the one or more abstract data types comprise graphs, trees, lists, state machines, hash tables, and Bayesian networks.

10. The method of claim 1, wherein the probability of the each instance is computed based on one or more of the conditions comprising a number of other events, a type of the other events, an order of the other events, and a timing of the other events.

11. The method of claim 1, further comprising receiving and storing events from the one or more security devices in the event collection database.

12. The method of claim 1, further comprising removing the each instance from memory, if the probability is greater than the global threat assessment event probability.

13. A system for dynamically assessing threats to computers and computer networks, comprising:
    one or more security devices that generate events;
    an event collection database, wherein the event collection database collects and stores events of the one or more security devices;
    policy configuration information, wherein the policy configuration information comprises a global threat assessment event generation probability and one or more dynamic threat assessment rules comprising event probability information; and
    a dynamic threat assessment engine,
    wherein the dynamic threat assessment engine accepts the policy configuration information;
    wherein the dynamic threat assessment engine generates one or more abstract data types for the one or more dynamic threat assessment rules;
    wherein the dynamic threat assessment engine reads each event in the event collection database;
    wherein the dynamic threat assessment engine determines if the each event is a member of each instance of the one or more abstract data types for each of the one or more dynamic threat assessment rules;
    wherein if the each event is a member of the each instance, the dynamic threat assessment engine adds the each event to the each instance and computes a probability of the each instance;
    wherein the dynamic threat assessment engine determines if the probability is greater than the global threat assessment event generation probability;
    wherein if the probability is greater than the global threat assessment event generation probability, the dynamic threat assessment engine generates a dynamic threat assessment event and places the dynamic threat assessment event in the event collection database;
    wherein the dynamic threat assessment engine determines if the each event is a starting member of an instance of the one or more abstract data types for each of the one or more dynamic threat assessment rules; and
    wherein if the each event is a starting member of the instance, the dynamic threat assessment engine creates the instance and adds the each event to the instance.

14. The system of claim 13, wherein the one or more security devices comprise an intrusion detection system, a network intrusion detection system, a host intrusion detection system, a router, a firewall, and a system logger.

15. The system of claim 13, wherein the policy configuration information further comprises rule probability thresholds.

16. The system of claim 15, wherein the dynamic threat assessment engine determines if the probability is greater than a rule probability threshold for the each instance.

17. The system of claim 16, wherein if the probability is greater than the rule probability threshold for the each instance, the dynamic threat assessment engine generates a dynamic threat assessment event and places it in the event collection database.

18. The method of claim 16, wherein the dynamic threat assessment engine removes the each instance from memory, if the probability is greater than the rule probability threshold for the each instance.

19. The method of claim 13, wherein the policy configuration information further comprises event collection database configurations.

20. The method of claim 13, wherein the policy configuration information further comprises operation parameters.

21. The system of claim 13, wherein the one or more abstract data types comprise graphs, trees, lists, state machines, hash tables, and Bayesian networks.

22. The system of claim 13, wherein the probability of the each instance is computed based on one or more of the conditions comprising a number of other events, a type of the other events, an order of the other events, and a timing of the other events.

23. The system of claim 13, wherein the event collection database receives and stores events from the one or more security devices.

24. The method of claim 13, wherein the dynamic threat assessment engine removes the each instance from memory, if the probability is greater than the global threat assessment event probability.

25. The system of claim 13, wherein the event collection database comprises the logging system of a security device that generates events.

26. The system of claim 13, further comprising a management console comprising the event collection database, the policy configuration information, and the dynamic treat assessment engine.

* * * * *